Figure 1:
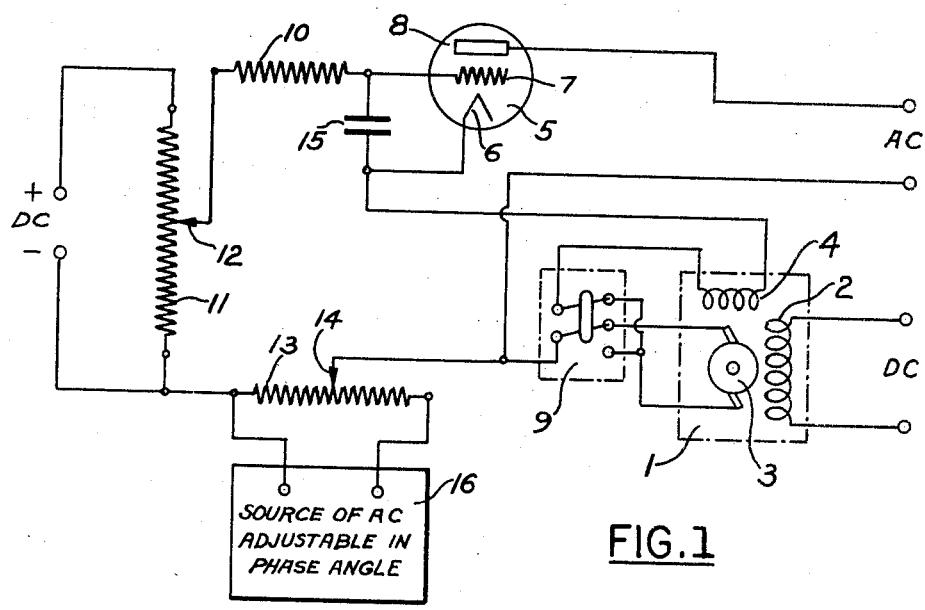

Dec. 2, 1941.   H. A. SATTERLEE   2,264,333
VARIABLE SPEED MOTOR SYSTEM
Filed May 31, 1939   3 Sheets-Sheet 1

INVENTOR.
HOWARD A. SATTERLEE
BY
Ezekiel Wolf
ATTORNEY.

Dec. 2, 1941.  H. A. SATTERLEE  2,264,333
VARIABLE SPEED MOTOR SYSTEM
Filed May 31, 1939   3 Sheets-Sheet 2

INVENTOR.
HOWARD A. SATTERLEE
BY
Ezekiel Wolf
ATTORNEY.

INVENTOR.
HOWARD A. SATTERLEE
BY Ezekiel Wolf
ATTORNEY.

Patented Dec. 2, 1941

2,264,333

UNITED STATES PATENT OFFICE 2,264,333

VARIABLE SPEED MOTOR SYSTEM

Howard A. Satterlee, Needham, Mass., assignor to Submarine Signal Company, Boston, Mass., a corporation of Maine Application May 31, 1939, Serial No. 276,519

11 Claims. (Cl. 172—179)

The present invention relates to motor control systems especially the type in which a gaseous discharge tube is employed to furnish the motor current.

In my prior United States Patents Nos. 2,131,759, 2,147,674 and 2,163,632 I described a motor speed control system in which a direct current type motor having a separately excited field had its armature supplied with current by a grid-controlled gaseous discharge tube to whose grid there was applied a direct current potential adjustable in magnitude in accordance with the desired speed, this potential being opposed by a potential varying with the motor's speed. This system has a practically flat speed-load characteristic throughout the entire speed range of the motor, that is at any given setting of the adjustable positive grid potential the motor's speed will remain substantially constant though the load vary from no load to full load.

However, because in this system the motor is supplied with current impulses only when the opposing voltage is less than the positive applied voltage so that the tube's grid becomes sufficiently positive to permit current to flow, and each of the current impulses which occur have a duration of substantially the entire positive half wave of anode potential, the motor may for a small fraction of a second (a few cycles) be caused to run at too high a speed. Thus, current impulses are not always supplied to the motor in each cycle of the anode potential, but a few cycles may be omitted. The instantaneous motor speed may therefore vary considerably, although, as before stated, the average speed is substantially constant. This condition may be described as "jumpy" motor operation. It appears mostly at light motor loads and is more evident at slow speeds than at higher speeds.

The present invention completely overcomes this difficulty and makes the system produce a smooth current flow through the motor, resulting in smooth motor operation at all speeds from practically zero speed to maximum. Moreover, the flat speed-load characteristic above mentioned can be retained at all speeds. Likewise, the simplicity of the system and the ease and flexibility of control are fully retained.

The present invention differs from the arrangement described above in that I apply to the grid of the rectifier, in addition to the adjustable positive direct potential and the negative potential varying with motor speed, an alternating potential lagging a quarter of a cycle or so behind the anode potential. Alternating potentials of varying phase angles have heretofore been applied to the grids of gaseous discharge tubes, but I use only a very small value of alternating grid potential, say about one percent of the value of applied anode potential. This alternating potential is, as above stated, used in combination with the other two direct grid potentials.

I have discovered that the value of alternating grid potential, as well as its phase angle, are relatively critical. Satisfactory operation throughout a large speed range can only be obtained when these factors are held within rather narrow limits. Within smaller speed ranges, however, greater variation from these limits may be tolerated, but they still are not so vary large.

The invention can be applied not only when a single rectifier tube is used for operation of a motor, but also where two tubes are used, one for each direction of rotation as described in my United States Patents Nos. 2,147,674 and 2,131,759.

Figure 2:
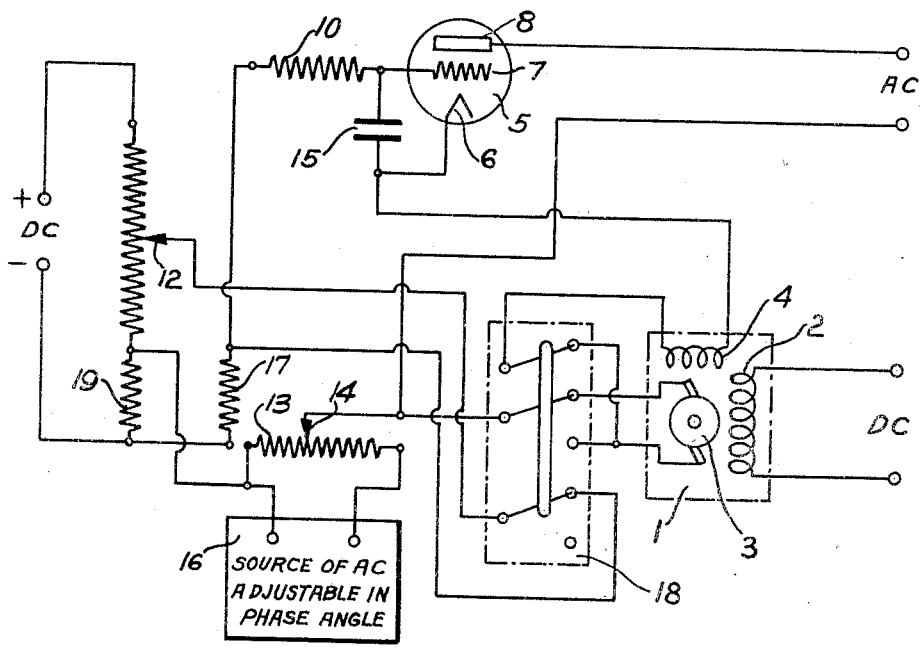
Figure 3:
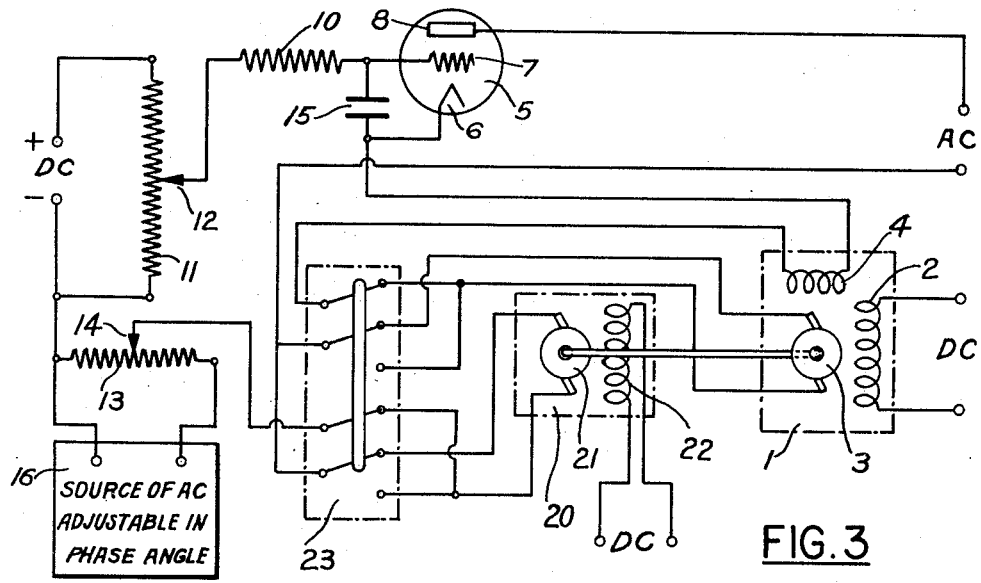
Figure 4:
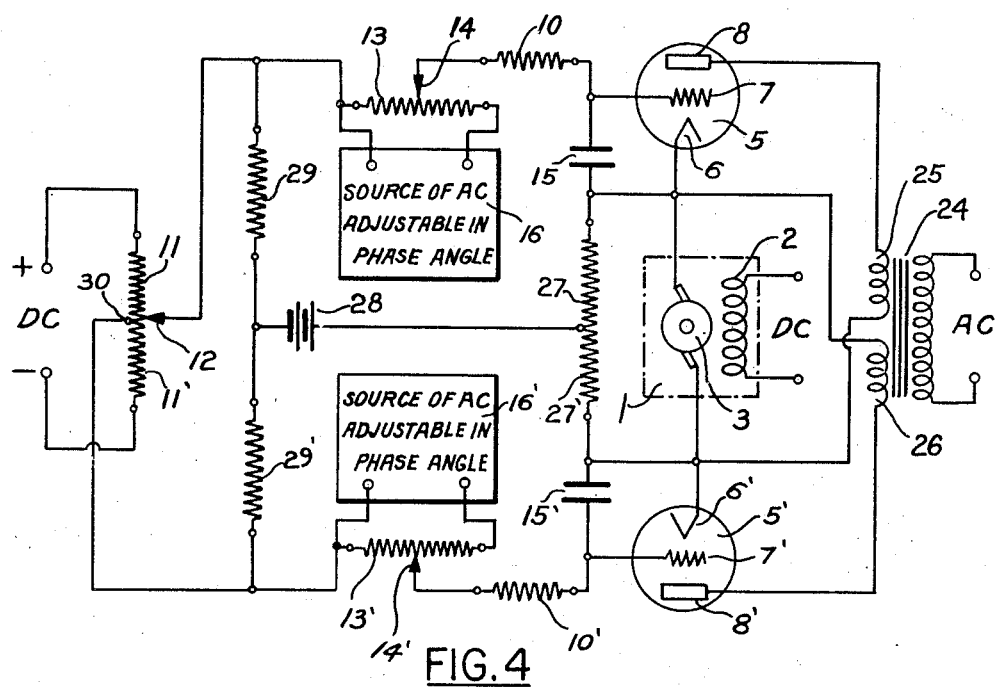
Figure 5:
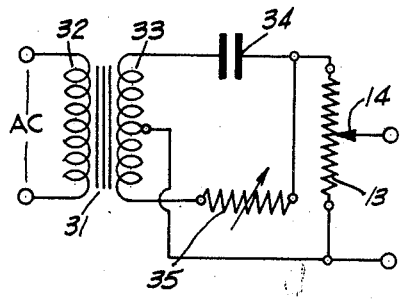
Figure 6:
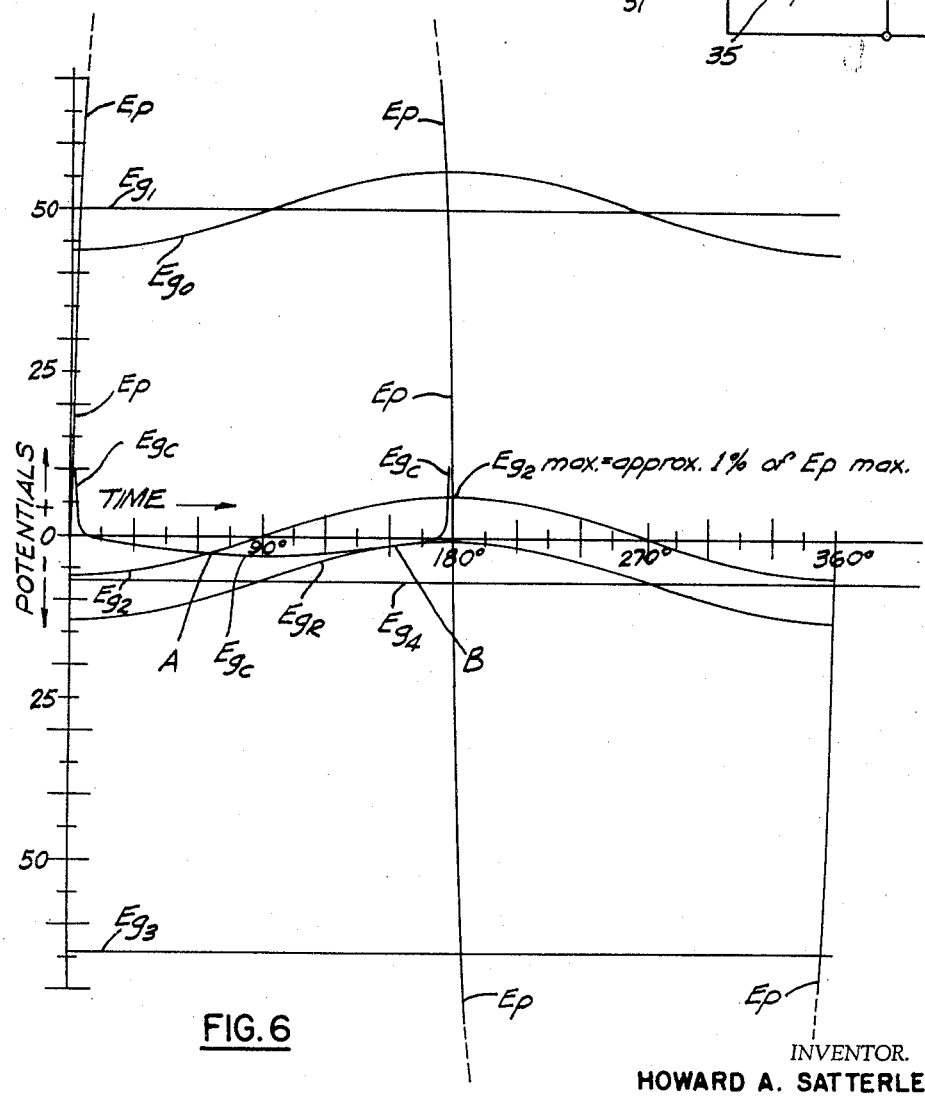

The invention will best be understood from the following description taken in connection with the accompanying drawings in which Fig. 1 shows schematically a simple form of the present invention in which the speed-responsive potential comprises the back E. M. F. generated by the motor's armature; Fig. 2 is a modification of Fig. 1 in which means are provided for rapidly stopping the motor; Fig. 3 is another modification of Fig. 1 in which the speed-responsive potential is supplied by a pilot generator; Fig. 4 is a further modification of the invention by means of which rapid reversal of motor operation can be obtained; Fig. 5 is an example of a circuit arrangement whereby an alternating potential adjustable in magnitude and phase can be obtained; and Fig. 6 is a diagram showing grid and anode potentials in accordance with the invention.

As shown in Fig. 1, the motor 1, which is to be controlled, has a separately excited field winding 2 supplied with direct current. It may, of course, be replaced by a permanent field magnet. The armature of the motor is indicated at 3 and is of the wound rotor, commutator type as customarily used with direct current motors. The motor may also be, and preferably is, provided with a series field and interpoles which together are indicated at 4. The motor is supplied with current through a grid controlled rectifier 5 from a source of alternating current. The rectifier 5 is of the gaseous discharge type, that is its characteristics are such that when a discharge or current flow has once commenced between anode and cathode, the discharge will continue even in spite of a negative grid potential until the alternating anode potential reverses its sign. The tube 5 has a hot cathode 6, a grid 7 and an anode 8. The anode, cathode, motor armature and series field are all connected in series across the alternating power supply. As shown in the drawing, a reversing switch 9 is inserted in this circuit so that the connections of the motor armature can be reversed at will.

The grid circuit of the tube 5 includes in series the grid 7; a current-limiting resistor 10; a potentiometer 11 having a movable contact element 12 and providing a direct potential; a second potentiometer 13 having a movable contact 14 and providing an alternating potential of phase angle displaced from that of the anode potential; the motor armature and series field; and finally the cathode 6. A stabilizing condenser 15 is also provided between the grid 7 and the cathode 6 to maintain the grid at cathode potential for high frequencies. The extremities of the potentiometer 11 are connected across a source of direct potential as shown while the extremities of the potentiometer 13 are connected to a source of alternating potential indicated at 16. The device 16 may be any suitable arrangement for providing the desired alternating potential. An example of such a device is shown in Fig. 5 which will be described below. In the drawings the device 16 has been marked with the legend "Source of A. C. adjustable in phase angle." It will be understood, however, that when the device has once been adjusted to provide the proper phase angle, further adjustment is seldom, if ever, required. Likewise the potentiometer 13 which provides for adjustment of the magnitude of the alternating potential supplied by the device 16 can usually be adjusted when the circuit elements are first assembled and seldom if ever thereafter requires further adjustment.

It will be evident now that the grid circuit of the tube 5 contains in series three voltage sources, viz., a source of direct potential adjustable in magnitude, a source of alternating potential and a second source of direct potential responsive to the motor's speed and represented by the back E. M. F. generated by the armature 3.

The curves in Fig. 6 show the principles of operation of the applicant's system, both with regard to Fig. 1 and the modifications thereof, as the applicant believes them to be, but the applicant does not wish to be bound by this particular theory of operation.

In Fig. 6 a single cycle of anode potential assumed to be sinusoidal in form, is partially indicated at $E_p$, the maximum values being too large to show on the graph. The abscissae of the graph are given in degrees and the ordinates in voltage units. The curve $E_{g_c}$ is the critical grid voltage curve of one type of grid controlled gaseous discharge tube. This curve indicates with reference to the sinusoidal anode potential $E_p$ the potential which the grid must have with respect to the cathode of the tube in order for a discharge to commence. According to the present invention there is applied to the grid an alternating potential, for example, $E_{g_2}$ which has a maximum value of approximately one percent of the maximum value of the anode potential $E_p$. As shown in Fig. 6 $E_{g_2}$ lags the anode potential $E_p$ by 90°. If the circuit is arranged as in Fig. 1 and no negative grid bias potential is supplied, the curve $E_{g_2}$ will be the only potential on the grid when the line switches are first closed. Since the curve $E_{g_2}$ crosses the critical voltage curve $E_{g_c}$ at the point A, anode current will flow through the tube and the motor armature commencing with the point A in the anode potential cycle and continue to the end of the half cycle when the anode potential becomes negative. As soon, however, as the motor's speed is sufficient to cause the armature to generate a back E. M. F. equal to $E_{g_4}$, the resultant grid potential will be reduced to $E_{g_R}$ which is tangent to the critical voltage curve at the point B, thereby supplying current impulses to the motor armature only during a short time interval near the end of the positive half cycles of anode potential. The motor will then operate at a very slow speed which may be as slow as 1 or 2 R. P. M. for a motor normally designed to run at 1800 R. P. M. However, it should be noted that if the magnitude of $E_{g_2}$ is properly adjusted, and if the phase angle by which it lags $E_p$ is properly chosen, the motor armature will receive a current impulse in every positive half cycle of anode potential so that its operation will be quite smooth.

To operate the motor at any higher speed, a positive direct potential is applied to the grid by means of the potentiometer 11 as, for example, $E_{g_1}$. This has the effect of raising the curve $E_{g_2}$ to $E_{g_0}$ and immediately causes current impulses to be supplied to the motor for substantially the full half cycle of anode potential, thus providing a high torque to bring the motor rapidly up to a new speed level. The latter will be reached when the motor back E. M. F. corresponds to $E_{g_3}$, bringing the resultant grid potential back to $E_{g_R}$ or some other similar curve which intersects the critical voltage curve $E_{g_c}$ at such a point of time in the positive half cycles of $E_p$ as to provide sufficient power to turn the armature at the required speed under the load conditions then existing.

It will be evident that the system is very sensitive to speed changes, for even slight changes in the back E. M. F., $E_{g_3}$, will produce a raising or lowering of the curve $E_{g_2}$, thereby changing the point of time in the positive half cycles of $E_p$ at which the critical grid voltage is exceeded causing a discharge through the tube to begin. The power supplied to the armature in each positive half cycle of anode potential is therefore very closely regulated and the motor speed remains constant even with fluctuations in the load.

As above stated, I have found that the magnitude of the alternating grid potential $E_{g_2}$ and its phase angle with respect to the magnitude and phase angle of the anode potential $E_p$ are relatively critical. These values may vary slightly for different tubes with different critical voltage curves $E_{g_c}$ and perhaps also for different motors having different values of armature reactance. They may also be affected by alternating current components in the motor field excitation which for best results is well filtered to provide substantially pure direct current. The best values of magnitude and phase angle of the alternating grid potential $E_{g_2}$ depend somewhat upon the extent of the speed range over which the motor must operate; that is to say more accurate speed regulation can be obtained for small speed ranges than for large ones and the magnitude and phase angle of $E_{g_2}$ to obtain the closest speed regulation may be somewhat different when only a small speed range is required than when a very large range is necessary. For any given speed, adjustment can be made to provide for speed variations between no load and full load of not greater than one percent. When the required speed range is very large, say, for example, 1000 to 1 or more, adjustment of magnitude and phase angle of $E_{g_2}$ can be made so that without further adjustment the motor will run smoothly at any speed, depending upon the setting of the potentiometer 11, and with a speed regulation such that full-load speed is within ±10% of no-load speed.

In practice, satisfactory values of magnitude and phase angle $E_{g_2}$ can usually conveniently be found by setting the potentiometer 11 to provide a rather low motor speed and making $E_{g_2}$ approximately 5% of $E_p$. The relative phase angle of $E_{g_2}$ can then be adjusted until the motor runs most smoothly. $E_{g_2}$ can then be reduced in magnitude to obtain still smoother operation, whereupon the phase angle can be readjusted slightly, and so on until the best condition is found. Finally, a slight reduction in the phase lag of $E_{g_2}$ and a sufficient increase in its magnitude to bring back smooth operation will produce the best adjustment for most purposes.

As above stated, I have found that the optimum value of $E_{g_2}$ is close to one percent of the anode potential with a phase angle of 75° to 80° lagging. The magnitude of $E_{g_2}$ may in some cases be decreased to about 0.7% of $E_p$ or increased to not more than about 3% of $E_p$ while the phase angle may be within 50° to 120° lagging $E_p$. Within these limits varying degrees of smoothness of motor operation and more or less accuracy of speed regulation within various speed ranges will be obtained. If the magnitude of $E_{g_2}$ is made too large, the speed regulation tends to become bad. If it is not made large enough, motor operation will become jumpy particularly at low speeds and light loads. Similarly, if the phase lag of $E_{g_2}$ with respect to $E_p$ is made too small, motor operation will be jumpy whereas if it is made too great, a somewhat similar effect will take place.

The above comments also apply to the modifications shown in the other figures.

In the modification shown in Fig. 2 an arrangement is provided whereby the motor may be brought to a sudden stop. This operation is generally known as "plugging the motor." In general the circuit arrangement is the same as that shown in Fig. 1 and similar parts have been given the same reference numerals. There is, however, provided a high resistance 17 connected between the current limiting resistor 10 and the negative side of the direct current line. There is also provided a switch 18, shown in its upper position, which, when thrown to its lower position, not only reverses the connections of the armature 3 in the circuit, but also opens the connection between the movable contact 12 of the potentiometer 11 and the grid of the tube 5. By virtue of the resistor 17 the grid 7 is then brought to the potential of the cathode 6 except for the potentials supplied by the device 16, the motor back E. M. F. and the negative bias supplied by the potential drop across resistor 19. Since, however, the connections of the armature 3 have been reversed, the E. M. F. generated by the motion of the armature in its magnetic field will be in such a direction as to make the grid 7 positive. This will cause current to flow through the tube and the motor armature but in such a direction as to tend to reverse the direction of rotation of the armature 3. However, as soon as the armature reaches zero speed, the positive grid potential which it had been supplying will be reduced to zero, leaving the grid at the cathode potential except for that supplied by the device 16 and resistor 19. The latter is large enough to provide sufficient negative bias to reduce the positive potential of the device 16 to below the critical grid voltage curve whereby the motor will rapidly come to a complete stop.

The modification shown in Fig. 3 is also similar to that shown in Fig. 1 except that the speed-responsive potential is not obtained from the armature back E. M. F. but from a pilot generator 20 having an armature 21 driven by the armature 3 of the motor and a separately excited field 22. For the purpose of reversing the motor, the reversing switch 23 must as shown reverse the armatures of both the pilot generator and the motor. A motor-plugging system as shown in Fig. 2 can, of course, also be applied to the modification of Fig. 3.

Fig. 4 is a modification of the invention whereby reversal of the motor armature 3 can be obtained without the use of a reversing switch. In general this circuit has previously been described in my United States Patent No. 2,147,674 with the exception that in accordance with the present invention a component of alternating potential supplied by the devices 16 and 16' is inserted in the grid circuit of each of the tubes 5 and 5'. Briefly, the motor armature is connected in the anode circuits of the two rectifiers 5 and 5', by means of the transformer 24 having two secondaries 25 and 26, in such a way that the current through one rectifier will pass through the armature in one direction while the current from the other rectifier will pass through the armature in a reverse direction. The armature 3 is shunted by a center-tapped resistor having the two halves 27 and 27'. The center-tap is connected through a biasing battery 28 to another center-tapped resistor having the two portions 29 and 29'. A direct potential adjustable in magnitude and polarity in accordance with the desired speed and direction of rotation of the motor is provided by a center-tapped potentiometer connected across a source of direct current and having two portions 11 and 11' upon which is arranged the movable contact 12. The extremities of the elements 29 and 29' are respectively connected one to the movable contact 12 and the other to the potentiometer center-tap 30. The extremity of the element 29 is also connected to one end of the potentiometer 13 whereby an alternating potential is introduced into the circuit from the device 16. The potentiometer 13 leads by way of the movable contact 14 and the current-limiting resistor 10 to the grid 7. In a similar manner the extremity of the element 29' is connected through potentiometer 13', movable contact 14' and current-limiting resistor 10' to the grid 7'. High frequency by-pass condensers 15 and 15' are also provided between the grids and cathodes of the tubes 5 and 5', respectively.

As more fully explained in my United States Patent No. 2,147,674 placing the movable contact 12 along the upper portion 11 of the potentiometer will cause the grid 7 of the tube 5 to become positive and to permit current to pass through this rectifier to operate the motor in one direction. On the other hand, when the contact 12 is moved along the lower portion 11' of the potentiometer, the tube 5' will pass current to rotate the motor armature in the reverse direction.

It will be understood that this circuit may be modified in accordance with all the arrangements set forth in my United States Patents Nos. 2,131,759 and 2,147,674. However, the introduction into the grid circuit of each of the rectifiers of an alternating potential of small magnitude and a phase angle lagging that of the anode potential as previously explained with reference to Fig. 1 will make the system operate more smoothly particularly at light loads and low speeds.

A suitable arrangement for obtaining the alternating grid potential of suitable phase angle and magnitude is shown in Fig. 5. The transformer 31 has its primary 32 connected across a source of alternating potential of the same frequency as that which supplies the anodes of the rectifiers. The center-tapped secondary 33 of the transformer 31 is connected across a series circuit containing a condenser 34 and a resistance 35 which is preferably adjustable. The center-tap of the secondary 33 is connected to one end of the potentiometer 13 whose other end is connected to the common terminals of the condenser 34 and the resistance 35. The potentiometer 13 with its movable contact 14 is the same as those having the same reference numerals shown in the other figures of the drawings.

It will be understood by those skilled in the art that there are many other arrangements for obtaining alternating potentials of proper phase angle and magnitude which would be equally suitable for use in the present invention and that the arrangement shown in Fig. 5 is given merely by way of example.

Having now described my invention, I claim:

1. A variable speed driving system for an electric motor including a grid-controlled rectifier of the gaseous discharge type, means for passing the rectifier current through the motor armature and means for controlling said current comprising means for impressing on the grid with respect to the cathode of the rectifier a positive direct potential adjustable in magnitude, a negative direct potential variable in magnitude in proportion to the actual motor speed and an alternating potential having a magnitude small compared to the magnitude of the alternating anode potential and a phase angle lagging the anode potential by approximately one quarter of a cycle and means for bringing the motor to an abrupt stop including a resistor and means for reversing the polarity of said potential which varies with motor speed, removing said direct positive adjustable grid potential and connecting said resistor, in series with said source of alternating potential and said potential which varies with motor speed, between the grid and cathode of the rectifier.

2. A variable speed driving system for an electric motor having an armature rotatable in a continuous magnetic field including a grid-controlled rectifier of the gaseous discharge type, means for passing the rectifier current through the motor armature and means for controlling said current comprising means for impressing on the grid with respect to the cathode of the rectifier a positive direct potential adjustable in magnitude, a negative direct potential of a magnitude proportional to and derived from the motor back E. M. F. and an alternating potential having a magnitude small compared to the magnitude of the alternating anode potential and a phase angle lagging the anode potential by approximately one quarter of a cycle and means for bringing the motor to an abrupt stop including a resistor and means for reversing the polarity of said potential which varies with motor speed, removing said direct positive adjustable grid potential and connecting said resistor, in series with said source of alternating potential and said potential which varies with motor speed, between the grid and cathode of the rectifier.

3. A system for controlling the rotation of a motor having an armature, a pair of grid-controlled rectifiers, circuit connections between said rectifiers and said armature adapted to pass the current from one rectifier through the armature in one direction and the current from the other rectifier through the armature in the reverse direction, means for applying a direct potential to the grids of said rectifiers of a polarity and substantially of a magnitude corresponding to the desired direction and speed of rotation respectively of said motor, means for opposing said potential with a potential varying in polarity and magnitude in proportion to the motor speed and means for also applying between the grid and cathode of each rectifier an alternating potential having a magnitude small compared to the magnitude of the alternating anode potential and a phase angle lagging the same by approximately one quarter of a cycle.

4. A system for controlling the rotation of a motor having an armature, a pair of grid-controlled rectifiers, circuit connections between said rectifiers and said armature adapted to pass the current from one rectifier through the armature in one direction and the current from the other rectifier through the armature in the reverse direction, means for applying a direct potential to the grids of said rectifiers of a polarity and substantially of a magnitude corresponding to the desired direction and speed of rotation respectively of said motor, means for opposing said potential with a potential varying in polarity and magnitude in proportion to the motor speed and means for also applying between the grid and cathode of each rectifier an alternating potential having a magnitude of substantially one percent of the magnitude of the alternating anode potential and a phase angle lagging the same by 75° to 80°.

5. A system for controlling the rotation of a motor having an armature, a pair of grid-controlled rectifiers, circuit connections between said rectifiers and said armature adapted to pass the current from one rectifier through the armature in one direction and the current from the other rectifier through the armature in the reverse direction, means for applying a direct potential to the grids of said rectifiers of a polarity and substantially of a magnitude corresponding to the desired direction and speed of rotation respectively of said motor, means for opposing said potential with a potential varying in polarity and magnitude in proportion to the motor speed and means for also applying between the grid and cathode of each rectifier an alternating potential having a magnitude of between 0.7% and 3.0% of the magnitude of the alternating anode potential and a phase angle lagging the same between 50° and 120°.

6. A system for controlling the rotation of a motor having an armature, a pair of grid-controlled rectifiers, circuit connections between said rectifiers and said armature adapted to pass the current from one rectifier through the armature in one direction and the current from the other rectifier through the armature in the reverse direction, means for applying a direct potential to the grids of said rectifiers of a polarity and substantially of a magnitude corresponding to the desired direction and speed of rotation respectively of said motor, means for opposing said potential with the back E. M. F. of said motor, and means for also applying between the grid and cathode of each rectifier an alternating potential having a magnitude small compared to the magnitude of the alternating anode potential and a phase angle lagging the same by approximately one quarter of a cycle.

7. A system for controlling the rotation of a motor having an armature, a pair of grid-controlled rectifiers, circuit connections between said rectifiers and said armature adapted to pass the current from one rectifier through the armature in one direction and the current from the other rectifier through the armature in the reverse direction, means for applying a direct potential to the grids of said rectifiers of a polarity and substantially of a magnitude corresponding to the desired direction and speed of rotation respectively of said motor, means for opposing said potential with the back E. M. F. of said motor, and means for also applying between the grid and cathode of each rectifier an alternating potential having a magnitude of substantially one percent of the magnitude of the alternating anode potential and a phase angle lagging the same by 75° to 80°.

8. A system for controlling the rotation of a motor having an armature, a pair of grid-controlled rectifiers, circuit connections between said rectifiers and said armature adapted to pass the current from one rectifier through the armature in one direction and the current from the other rectifier through the armature in the reverse direction, means for applying a direct potential to the grids of said rectifiers of a polarity and substantially of a magnitude corresponding to the desired direction and speed of rotation respectively of said motor, means for opposing said potential with the back E. M. F. of said motor, and means for also applying between the grid and cathode of each rectifier an alternating potential having a magnitude of between 0.7 and 3.0% of the magnitude of the alternating anode potential and a phase angle lagging the same between 50° to 120°.

9. A system for controlling the rotation of a motor having an armature, a pair of grid-controlled rectifiers, circuit connections between said rectifiers and said armature adapted to pass the current from one rectifier through the armature in one direction and the current from the other rectifier through the armature in the reverse direction, a center-tapped resistor having its center tap connected to the cathodes of said rectifiers, two sources of alternating potential having a magnitude small compared to the magnitude of the alternating rectifier anode potential and having a phase angle lagging the same by approximately one quarter of a cycle, means for connecting said sources one between the grid of each rectifier and one extremity of said resistor respectively, means for applying a direct potential variable in magnitude and polarity corresponding to the desired speed and direction of rotation of said motor respectively across said resistor and means for applying a potential substantially proportional at all times to the back E. M. F. of said motor in the grid-cathode circuit of each of said rectifiers in a series opposed relation to the direct potential existing across the respective halves of said center-tapped resistor.

10. A variable speed driving system for an electric motor including a grid-controlled rectifier of the gaseous discharge type, means for passing the rectifier current through the motor armature, and means for controlling said current including means for impressing on the grid of the rectifier a potential which is the resultant of a direct positive potential adjustable in accordance with the desired motor speed, a direct negative potential varying in proportion to the actual motor speed, an alternating potential having a magnitude small compared to the magnitude of the alternating anode potential and a phase angle lagging the latter by approximately one quarter of a cycle, and a direct negative biasing potential of a magnitude sufficient to inhibit discharge of the rectifier when the grid excitation consists otherwise only of said alternating potential.

11. A variable speed driving system for an electric motor having an armature, a series field winding and a separately, continuously excited field winding, including, in combination, a grid-controlled rectifier having anode, cathode and grid electrodes; a source of alternating potential; circuit connections from said anode to one terminal of said source and from the other terminal of said source through said armature, thence through said series field winding and thence to said cathode; a by-pass condenser connected between said grid and said cathode; a grid-current limiting resistor; a source of direct potential; a potentiometer connected across the latter and having a movable contact; a source of alternating potential adjustable in phase angle to be displaced approximately one quarter of a cycle lagging said first alternating potential; a potentiometer connected across said second source of alternating potential and having a movable contact whereby the magnitude of the alternating potential from said source between the movable contact and one extremity of the potentiometer is adjustable to a small fraction of the magnitude of said first alternating potential; and circuit connections from said grid through said current limiting resistor to the movable contact of said first potentiometer, from the negative terminal of the latter to one terminal of said second potentiometer, from the movable contact of the latter through said armature, thence through said series field and thence to said cathode.

HOWARD A. SATTERLEE.